United States Patent
Banerjee

(10) Patent No.: US 10,515,232 B2
(45) Date of Patent: *Dec. 24, 2019

(54) TECHNIQUES FOR FACILITATING SECURE, CREDENTIAL-FREE USER ACCESS TO RESOURCES

(71) Applicant: Onion ID Inc., Hayward, CA (US)

(72) Inventor: Anirban Banerjee, San Bruno, CA (US)

(73) Assignee: Onion ID, Inc., Haywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,115

(22) Filed: Feb. 11, 2019

(65) Prior Publication Data

US 2019/0251293 A1  Aug. 15, 2019

Related U.S. Application Data

(63) Continuation of application No. 14/971,778, filed on Dec. 16, 2015, now Pat. No. 10,223,549.

(60) Provisional application No. 62/125,401, filed on Jan. 21, 2015.

(51) Int. Cl.
| | |
|---|---|
| G06F 21/62 | (2013.01) |
| H04L 29/06 | (2006.01) |
| H04W 12/06 | (2009.01) |
| G06F 21/31 | (2013.01) |
| H04W 4/021 | (2018.01) |
| H04W 12/00 | (2009.01) |

(52) U.S. Cl.
CPC .......... *G06F 21/6272* (2013.01); *G06F 21/31* (2013.01); *H04L 63/083* (2013.01); *H04L 63/0853* (2013.01); *H04W 12/06* (2013.01); *H04L 63/06* (2013.01); *H04L 63/10* (2013.01); *H04L 63/20* (2013.01); *H04W 4/021* (2013.01); *H04W 12/00503* (2019.01)

(58) Field of Classification Search
CPC . G06F 21/6272; G06F 21/31; H04L 63/0853; H04L 63/083; H04L 63/10; H04L 63/06; H04L 63/20; H04W 12/06; H04W 12/00503; H04W 4/021
USPC .......................................................... 726/1
See application file for complete search history.

(56) References Cited

U.S. PATENT DOCUMENTS

| | | | | |
|---|---|---|---|---|
| 8,627,438 B1 * | 1/2014 | Bhimanaik | ............. | H04L 63/10 726/9 |
| 8,990,905 B1 * | 3/2015 | Bailey | ..................... | G06F 21/00 726/5 |

(Continued)

*Primary Examiner* — Taghi T Arani
*Assistant Examiner* — Badri Champakesan

(57) ABSTRACT

Techniques are disclose herein for facilitating secure user access to resources without user-provided credentials. More specifically, the techniques described herein eliminate the need for end users to remember and provide privileged resource authentication information (e.g., credentials) at the time of resource access. The system accepts and securely stores registration information for accessing privileged resources during a registration process. As discussed herein, the registration information can include identification and authentication information for each privileged resource. The authentication process can also include registration of one or more secondary authentication devices that are used to verify the identity of the end user in lieu of the end user providing credentials.

18 Claims, 8 Drawing Sheets

(56) References Cited

U.S. PATENT DOCUMENTS

| | | | | |
|---|---|---|---|---|
| 8,997,195 B1* | 3/2015 | Fadida | H04L 63/083 | 705/2 |
| 9,215,075 B1* | 12/2015 | Poltorak | H04L 63/04 | |
| 9,571,282 B1* | 2/2017 | Aggarwal | H04L 9/32 | |
| 2006/0052085 A1* | 3/2006 | Gregrio Rodriguez | H04L 12/2859 | 455/411 |
| 2007/0101401 A1* | 5/2007 | Genty | H04L 63/0442 | 726/3 |
| 2008/0059804 A1* | 3/2008 | Shah | G06F 21/41 | 713/186 |
| 2009/0300743 A1* | 12/2009 | Ma | H04L 41/0213 | 726/6 |
| 2010/0142499 A1* | 6/2010 | Zhang | H04L 63/08 | 370/338 |
| 2011/0231443 A1* | 9/2011 | Hannel | H04L 63/105 | 707/776 |
| 2012/0324558 A1* | 12/2012 | Pollock | H04L 63/0815 | 726/8 |
| 2013/0212653 A1* | 8/2013 | Hoghaug | G06F 21/34 | 726/5 |
| 2014/0189806 A1* | 7/2014 | Cho | H04L 63/107 | 726/4 |
| 2014/0365782 A1* | 12/2014 | Beatson | G06F 21/32 | 713/186 |
| 2015/0222604 A1* | 8/2015 | Ylonen | H04L 63/062 | 713/171 |
| 2015/0249540 A1* | 9/2015 | Khalil | H04L 63/0853 | 713/158 |
| 2015/0264569 A1* | 9/2015 | Toyota | H04W 12/06 | 726/7 |
| 2015/0365400 A1* | 12/2015 | Cox | H04L 63/0823 | 726/7 |
| 2016/0042163 A1* | 2/2016 | Zhai | G06F 21/316 | 726/3 |
| 2016/0173469 A1* | 6/2016 | Zhang | H04W 4/021 | 726/4 |
| 2016/0182479 A1* | 6/2016 | Kaplan | H04L 51/046 | 726/6 |
| 2016/0212100 A1* | 7/2016 | Banerjee | H04L 63/0281 | |
| 2016/0212132 A1* | 7/2016 | Banerjee | H04L 63/10 | |
| 2016/0212141 A1* | 7/2016 | Banerjee | H04L 63/0846 | |
| 2016/0219022 A1* | 7/2016 | Peterson | H04L 63/065 | |
| 2016/0241397 A1* | 8/2016 | Adam | H04L 9/0863 | |
| 2017/0093829 A1* | 3/2017 | Gitlin | H04L 63/08 | |
| 2017/0093860 A1* | 3/2017 | Hafernik | H04L 63/10 | |
| 2018/0255047 A1* | 9/2018 | Cicchitto | H04W 12/06 | |

\* cited by examiner

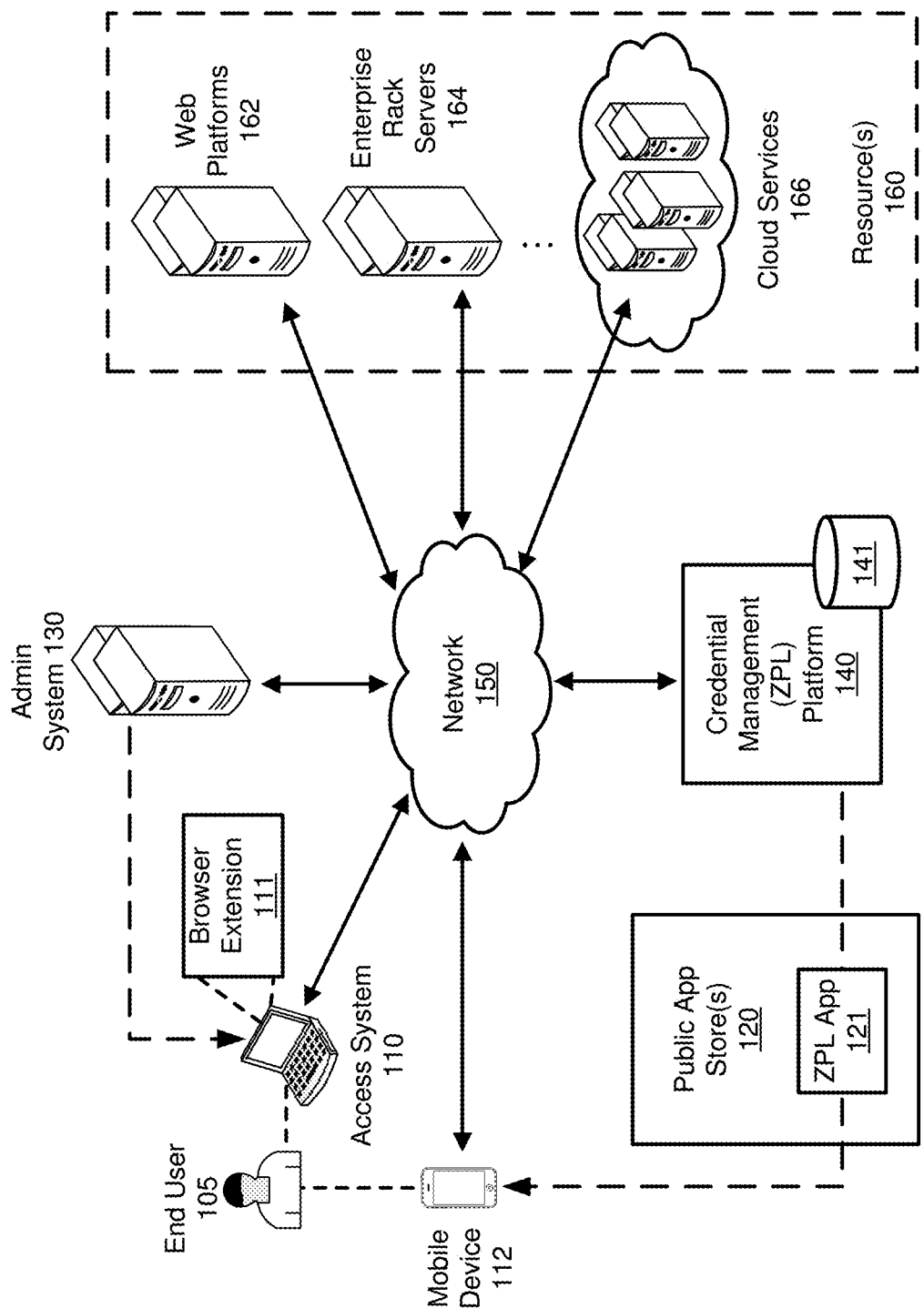

TECHNIQUES FOR FACILITATING SECURE, CREDENTIAL-FREE USER ACCESS TO RESOURCES

RELATED APPLICATIONS

This application is a continuation of and claims priority to U.S. application Ser. No. 14/971,778, filed Dec. 16, 2015, entitled "TECHNIQUES FOR FACILITATING SECURE, CREDENTIAL-FREE USER ACCESS TO RESOURCES," which claims the benefit of and priority to U.S. Provisional Patent Application No. 62/125,401, filed on Jan. 21, 2015, entitled "ZERO PASSWORD SESSION BASED LOG-INS," each of which is hereby incorporated by reference in their entirety.

TECHNICAL BACKGROUND

Aspects of the disclosure are related to computing hardware and software technology, and more particularly, to techniques for facilitating secure, credential-free user access to resources.

TECHNICAL BACKGROUND

Anyone with a suitable Internet appliance, such as a personal computer with a standard Internet connection, may access (or go on-line) and navigate web pages stored on Internet-connected servers for the purpose of obtaining information and initiating transactions with hosts of such servers and pages. Companies offer various subscription services accessible via the Internet. For example, it is common for people to bank, trade stocks, shop, etc., from the comfort of their own homes via Internet access. Typically, a user, through subscription, has access to personalized and secure web pages for such functions. By typing in a user name and a password or other personal identification code, a user may obtain information, initiate transactions, buy stock, and accomplish a myriad of other tasks.

Unfortunately, one problem that is encountered by an individual who has several or many such subscriptions to Internet-brokered services is that there are invariably many passwords and/or log-in codes to be used and it is not advisable to utilize the same password or code for every service as this poses an increased security risk. Furthermore, using different login identifiers and passwords for each on-line account presents numerous problems; not the least of which is remembering each login identifier and password. This secure access problem also manifests itself in an enterprise context. For example, employees must regularly access system servers. However, despite the security risks, passwords and/or other credential information are not regularly modified because such regular changes are often overly burdensome.

Overall, the examples herein of some prior or related systems and their associated limitations are intended to be illustrative and not exclusive. Upon reading the following, other limitations of existing or prior systems will become apparent to those of skill in the art.

Overview

Provided herein are systems, methods, and software that facilitate secure credential-free access to resources. In some embodiments, a cloud-based credential management apparatus is disclosed having one or more computer readable storage media with program instructions stored thereon, which when executed by the one or more processors, direct the one or more processors to perform various functions. In some embodiments, the functions include processing a protected resource access request initiated by a resource access system to identify a user and a protected resource that the user is attempting to access. The functions further include identifying a predetermined authentication policy associated with the protected resource, generating a request for authentication information based on the authentication policy associated with the protected resource, and sending the request for authentication information for delivery to a mobile device associated with the user. The functions further include processing a response to the authentication request sent by the mobile device to determine that the authentication policy is satisfied and, in response to determining that the policy is satisfied, generating a response to the protected resource access request including login credentials to access the protected resource.

In some embodiments, a computer-readable storage medium having a browser extension for operating with a web browser on an electronic computing device is disclosed. The browser extension includes program instructions, which when executed by the one or more processors of the electronic computing device, cause the electronic computing device to perform various functions. The functions can include detecting an attempt initiated by a user of the electronic device to access a resource, determining that the resource is a protected resource, and responsive to determining that the resource is a protected resource, generating a protected resource access request, the protected resource access request identifying the user and the protected resource that the user is attempting to access. The functions can further include receiving processing login credentials for accessing the resource, and populating a login form for the resource with the received login credentials without storing the login credentials.

In some embodiments, a method of operating a credential management system to provide a user with secure access to a resource without user-provided credentials is provided. The method includes receiving a protected resource access request initiated by a resource access system to identify a user and a protected resource that the user is attempting to access, identifying a predetermined authentication policy associated with the protected resource, and generating a request for authentication information for delivery to a mobile device associated with the user. In this example, the requested authentication information is determined based on the authentication policy associated with the protected resource. The method can further include receiving a response to the authentication request sent by the mobile device, determining if the authentication policy is satisfied, wherein the authentication policy comprises a progressive multi-factor authentication, and if the authentication policy is satisfied, generating a response to the protected resource access request including login credentials to access the protected resource.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 depicts a block diagram illustrating an example environment for facilitating secure, credential-free user access to resources, according to some embodiments.

TECHNICAL DISCLOSURE

Figure 2A:
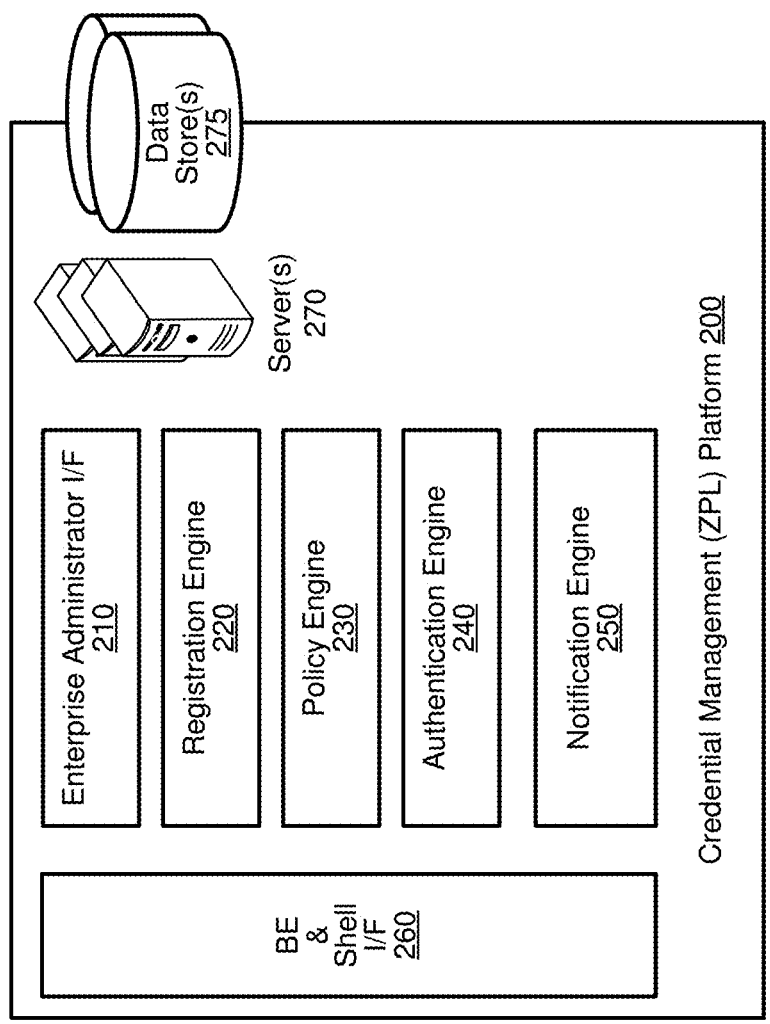
FIGS. 2A and 2B depict example components of a credential management (zero password login) platform, according to some embodiments.

Techniques are disclosed herein for facilitating secure user access to resources without user-provided credentials. More specifically, the techniques described herein eliminate the need for end users to remember and/or otherwise provide authentication information (e.g., credentials) for registered resources at access time. This credential-free access is also referred to as zero password login (ZPL) herein. In some embodiments, the system accepts and securely stores registration information for accessing privileged resources during a registration process. The registration information can include identification and authentication information for each privileged resource. The authentication process can also include registration of one or more secondary authentication devices and that are used to verify the identity of the end user in lieu of the end user providing credentials.

In some embodiments, various security policies can also be selected and/or otherwise established during the registration process. Furthermore, multi-factor authentication can be selected and/or otherwise triggered in response to an end-user requesting access to a protected resource. The multi-factor authentication can provide an end user with credential-free access to protected resources while maintaining an enhanced level of security.

In some embodiments, the identification information can include information identifying the privileged resource. For example, the privileged resource can be a webpage such as Facebook™. Likewise, the authentication information can include passwords, user names, personal identification numbers (PINs), etc., that are needed to obtain access to the privileged resource. Among other things, the privileged resources can be web applications, secure servers, or any other resource that requires authentication.

In some embodiments, the authentication information can include credentials like usernames, passwords, PINs, etc., by salting them with random bits, encrypting with one or more private keys generated and stored on the user's device and on other devices which may belong to subscribers of the system. Using various keys which are independently stored on various machines makes it extremely difficult for unscrupulous individuals to gather all the keys to break the encryption—thereby providing a very high barrier to breaking the encryption—without the cooperation of the end client.

The techniques described herein are primarily discussed with reference to two operational scenarios. In one scenario the end user is attempting to gain credential-free access to web platforms 162 and/or other cloud-based services 166 via a credential management (ZPL) platform 200. In another embodiments, an enterprise embodiment, an employee is attempting to gain credential-free access to an enterprise systems such as, for example, enterprise rack servers 164. It is appreciated that the various features and functionality discussed herein can be applied to either of the above operational scenarios in additional to various other operational sceneries that are not discussed herein for the sake of brevity.

The techniques introduced herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 depicts a block diagram illustrating an example environment 100 for facilitating secure, zero password user access to resources 160 via a credential management (zero password login) platform 140, according to some embodiments. More specifically, the example of FIG. 1 illustrates an environment in which end user 105 can obtain secure access to the resources 160 without providing user credentials (or login information) directly to the access system 110 (i.e., device which the end user is using to attempt to access the resource).

As shown in the example of FIG. 1, environment 100 includes the access system 110, a mobile device 112, a public app store 120 having a ZPL app 121 available for download, a credential management (ZPL) platform 140, a database or storage unit 141, and various resources 160. As shown, and by way of example and not limitation, the resources 160 can include web platforms 162, enterprise rack servers 164, and cloud services 166. In the example of FIG. 1, the access system 110 and the mobile device 112 are under the control of end user 105. A single end user 105, access device 110 and mobile device combination is shown for simplicity; however, the example environment 100 can include any number of access systems 110 and the mobile devices 112 under the control of any number of end users 105. Moreover, although shown as a single entity, it is appreciated that the credential management (ZPL) platform 140 can be physically and/or functionally distributed.

Prior to operation, one or more resources and devices are registered with the credential management (ZPL) platform 140. For example, the end user 105 can register details about a given resource and secondary security device(s), e.g., mobile device 112, with the credential management (ZPL) platform 140. In some embodiments, the device information can include contact information for secondary security devices such as, for example, a mobile number or IP address of an application operating on mobile device 112. Additionally, in some embodiments, an end user directs a secondary security device, e.g., mobile device 112 to download and installs the ZPL app 121 from the public app store 120 on mobile device 112 as part of a registration process with the credential management (ZPL) platform 140.

The registration details include at least some authentication or login credential information so that the user does not need to maintain (remember) and/or otherwise provide this information when accessing the resource. For example, an end user can provide username and password information for accessing the end user's Facebook™ account. Moreover, in the enterprise context, system administrators can increase the frequently in which they modify passwords to, for example, enterprise rack servers 164 for heightened security.

Additionally, the registration process can include selection and/or configuration of policies and policy information. The policies can include, by way of example, relative device proximity policies, geofencing policies, biometric identification policies, movement policies, etc.

The relative device proximity policies can include, for example, directing the mobile device 112 and/or the access system 110 to detect and report on their proximity. In some embodiments, the proximity can be determined based on Bluetooth connectivity or a determination as to Bluetooth RSSI strength to ascertain a physical distance between the mobile device 112 and the access system 110 (e.g., the machine used to attempt to access the resource). In such cases, RSSI strength being greater than a threshold can indicate that the mobile device 112 and the access system 110 are sufficiently proximate to satisfy the relative device proximity policy.

The geofencing policies can include, for example, directing the mobile device 112 and/or the access system 110 to detect and report geolocation information. In some embodiments, the system may already have this information as part of the request. For example, the geolocation information can include the IP address used to access the resource. In other instances, the policies can be configured to request an IP address from the mobile device as well. In any case, access to the resource is granted only when the user is within a predetermined geographical location or area. If the access systems 110 and/or the mobile device 112 is outside that predetermined location or areas, then access is not granted.

The biometric identification policies can include, for example, directing the mobile device 112 and/or the access system 110 to obtain fingerprint, retina, face, voice or biometric based identification information from the end user 105 and to report the information to the credential management (ZPL) platform 140.

The movement policies can include, for example, directing the mobile device 112 and/or the access system 110 to obtain movement information from the end user 105. The movement can include an air signature such as, for example, movement of the mouse, or a registered device such as mobile phone 112 to make a signature in the air, including shaking of a device in a specific manner, etc.

In the various examples discussed herein, authentication information is primary requested from the mobile device 112 and/or the access system 110. It is appreciated that any number of devices (including secondary authentication devices) can be registered and the various polices configured to direct those devices to obtain and send information to the credential management (ZPL) platform 140 for authentication.

As discussed herein, authentication polices can be configured for conditional or unconditional multi-factor authentication. For example, as discussed in more detail below, in some embodiments, various score or risk factors can be used to determine whether multi-factor authentication is triggered or whether additional factors of the multi-factor authentication should be utilized by the system to authenticate the user.

Although not illustrated for simplicity, in the example operation of FIG. 1, the end user 105 has downloaded and installed the ZPL app 121 from the public app store 120 onto mobile device 112. Additionally, access system 110 may be configured with a browser extension 111.

Figure 2B:
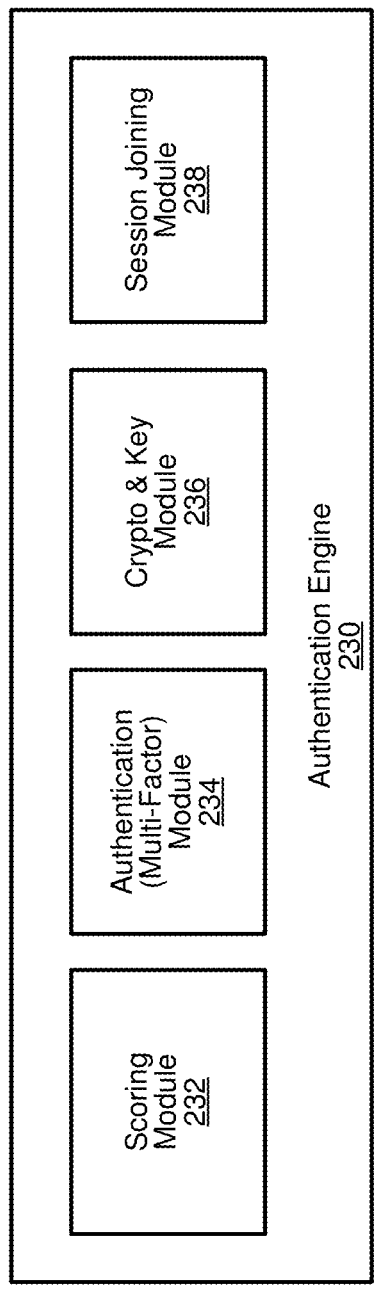

FIGS. 2A and 2B depict example components of a credential management (zero password login) platform 200, according to some embodiments. The credential management (zero password login) platform 200 can be the credential management (zero password login) platform 140 of FIG. 1, although alternative configurations are possible. The functions represented by the components, modules and/or engines described herein can be implemented individually or in any combination thereof, partially or wholly, in hardware, software, or a combination of hardware and software.

As illustrated in the example of FIG. 2A, the credential management (zero password login) platform 140 includes an enterprise administrator interface 210, a registration engine 220 a policy engine 230, an authentication engine 240, a notification engine 250, a browser extension (BE) and shell interface 260, one or more servers 270 and one or more data stores 275. Other systems, databases, and/or components are also possible. Some or all of the components can be omitted in some embodiments.

The enterprise administrator interface 210 is configured to interface with enterprise administrators in some embodiments. In enterprise settings, an enterprise administer can provide the credential management (zero password login) platform 200 with various registration and/or policy information. For example, the enterprise administrators can configure servers, e.g., enterprise rack servers 164, for protected access and/or periodically change passwords for enhanced security.

The registration engine 220 is configured to interface with an end user, administer, or bot to setup and/or update various resource registration information. As discussed here, the credential management (zero password login) platform 200 facilitates secure access to various resource by providing the authentication credentials to for, example, a browser extension executing on a web browser of an access device responsive to a request by an end user and subsequent verification that the end user is in fact who they say they are.

The policy engine 230 is configured to store and present various policy configuration options to end users and or system administers. The authentication engine 240 is configured to detect and apply the policies. A more detailed example of an example authentication engine is shown and discussed in greater detail with reference to FIG. 2B.

The notification engine 250 is configured to generate and provide various notifications to end users and/or system administrators. Notification can be sent, for example, to access system for display to an end users responsive to protected resource access requests. The BE and shell interface 260 is configured to interact with browser extensions installed on access systems, shell interfaces on access systems, and/or any other software modules or programs that are installed on access systems that are registered and configured to access the credential management (ZPL) platform.

Referring now to FIG. 2B, which depicts example components of the authentication module 230, according to some embodiments. As illustrated in the example of FIG. 2B, the authentication engine 230 includes a scoring module 232, an authentication (multi-factor) module 234, a crypto & key module 236, and a session joining module 238.

In the example of FIG. 2B, the scoring module 232 is configured to calculate a security level from the browsing behavior of an end client by generating a security-level evaluation, which is referred to herein as a score. By way of example, the score can be in the form of one or more of: a numerical score, an alphanumeric set of characters, or a visual identifier, such as color, sound, including combinations and/or variations thereof.

In some embodiments, the score can be used, for example, (a) to revoke a session ID to prevent an end user from accessing a resource, (b) as an answer to a third party or a resource that may choose to act upon it, (c) to ask the end user to for additional verification using other means. The score can be calculated in whole or in part at the credential management (ZPL) platform 140, the access system 110, and/or the mobile device 112, or any other electronic device.

In some embodiments, the system assesses, summarizes and depicts the security level of a browsing session that is allowing an end client to access a resource by generating a security-level score. The score can be in the form of a numerical score, an alphanumeric set of characters, and/or a visual identifier, such as color, sound, etc. In some embodiments, the goal of the score is to identify if the browsing behavior of the person who is accessing the protected resources deviates from the learned experience that has been taught to the system.

In some embodiments, the score can be generated based on any number of factors and can consider various broad categories. By way of example, the score can consider the following broad categories: the browsing behavior of the end client such as mouse pointer speed, scrolling speed, focus of the actions being performed on a webpage and more; external and historical information about how users are using the website; the likelihood of the end client accessing the resource at the time it is being accessed, where it is being accessed from and more; additional features that aid in the identification and/or classification of an end client's browsing behavior; etc.

In some embodiments, the score is calculated or generated using a multi-level approach which can be implemented as a hierarchy of modules. In some instances, a separate partial score can generated for each of these multiple categories. For example, there can be a module for each category and each module may consist of additional modules assessing specific aspects. In some embodiments, the system analyzes a site along multiple dimensions (i.e., with respect to a plurality of different website properties). The partial scores can then collected and combined by an integration module to generate the final score.

In some embodiments, the various techniques discussed herein may be performed a client side web-browser extension, a proxy, or a computer program that runs on an access system or secondary authentication device. The calculation of the score can use one mathematical function that incorporates all the indications and information pertinent to verifying the authenticity of the end client's, e.g., access systems, attempt to access the resource.

In some embodiments, the mechanism to calculate the security level of a site is highly customizable allowing the addition or deletion of parameters and factors, as the technology and business practices evolve.

In some embodiments, the security level of a site, can be represented in a non-limiting way as: (a) a numerical score, (b) an alphanumeric set of characters (e.g., B+), (c) a visual identifier, such as color, (d) a sound, (e) a graphical depiction such as a plot, or a set of multiple instances of all the above. Additionally, the system can generate detailed reports showing why the security level of a site is as reported and accompanied by optional tips on how to improve the score. The level of detail of this information can be defined by a tunable parameter that ranges from the raw output of all the data that the invention processed or it can be aggregated at an easier-to-understand level of granularity.

The authentication (multi-factor) module 234 is configured to provide a configurable multi-factor authentication. The multi-factor authentication is configured such that it is not intrusive, time consuming or confusing. The system can provide various multifactor authentication techniques that may seem invisible yet effective at ascertaining the authenticity of the identity of the end client.

The various options include but may not be limited only to (1) Bluetooth RSSI strength to ascertain how far physically a mobile or tablet device is from a machine used to access the resource (2) Geo-location fencing, based on the IP address used to access the resource, to make sure that access to the resource is granted only if the user is in certain geographical locations or is not granted of the user is in certain geographical locations. (3) Fingerprint, retina, face, voice or biometric based identification provided for by the device that is being used to access the resource or any other device that may have been registered as a second factor device by the end client (4) an air signature—movement of the mouse, or a device like a mobile phone to make a signature in the air, including shaking of a device in a specific manner and more.

The crypto & key module 236 is configured to securely store credentials for the end client, e.g., the access system and/or the end user, in the one or more data stores 275. For security, the stored credentials are encrypted. In some embodiments, the encryption can be accomplished through cryptography where multiple keys are generated and maintained on various machines not belonging to the end client.

The session joining module 238 is configured to join multiple sessions as discussed herein. An example of session joining is shown and discussed in greater detail with reference to FIG. 6. In some embodiments the credentials may never be transferred in any way shape or form to the access system. In such instances, only session IDs are transferred to the device being used. The system can help expire the session after a specified amount of time as set by the administrator of the organization or the end client themselves.

For example, in some embodiments, the cloud store proceeds to provide the end client with a valid session ID whenever they would like to use a protected resource, by using the stored encrypted credentials and the encryption key of the end client used to store the credentials in the first place. This allows for passwords and usernames to never reach the clients computer yet provide a seamless login experience. Furthermore the system can use various factors to determine of the end client trying to access the resource is actually the person/end client allowed to do so or not by using various features on their mobile phones, tablets, google glass and other devices.

Figure 3:
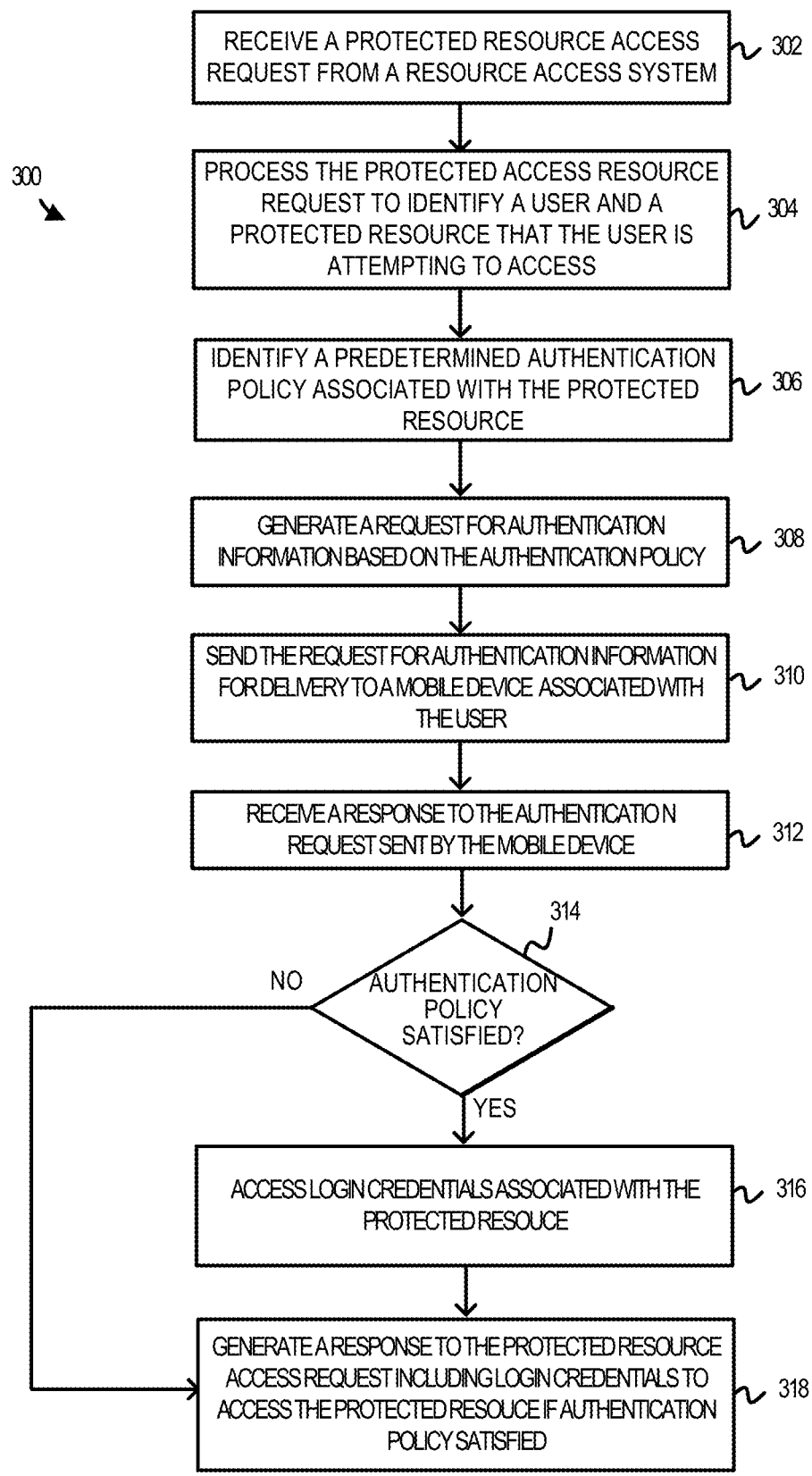
FIG. 3 depicts a flow diagram illustrating example operation of a credential management (zero password login) platform for providing login credentials to an access system for zero password login, according to some embodiments.

FIG. 3 depicts a flow diagram illustrating an example operation 300 for providing login credentials to an access system for zero password login, according to some embodiments. The example operation 300 may be performed in various embodiments by a credential management (zero password login) platform such as, for example credential management (zero password login) platform 140 of FIG. 1 or 200 of FIG. 2, one or more processors, and/or other modules, engines, components or tools associated with a credential management (zero password login) platform.

As discussed above, prior to execution of operation 300 it is assumed that one or more resources have been registered for the end user.

To begin, at step 302, the credential management (zero password login) platform receives a protected resource access request from a resource access system. At step 304, the credential management (zero password login) platform processes the protected resource access request to identify a user and a protected resource that the user is attempting to access. At step 306, the credential management (zero password login) platform identifies a predetermined authentication policy associated with the protected resource.

At step 308, the credential management (zero password login) platform generates a request for authentication information based on the authentication policy. At step 310, the credential management (zero password login) platform sends the request for authentication for delivery to a mobile device associated with the user. At step 312, the credential management (zero password login) platform receives a response to the authentication request sent by the mobile device.

At decision step 314, the credential management (zero password login) platform determines whether the authentication policy is satisfied. If the authentication policy is satisfied then, at step 316, the credential management (zero password login) platform accesses the login credentials associated with the protected resource. At step 318, the credential management (zero password login) platform generates a response to the protected resource access request that includes the login credentials.

Figure 4:
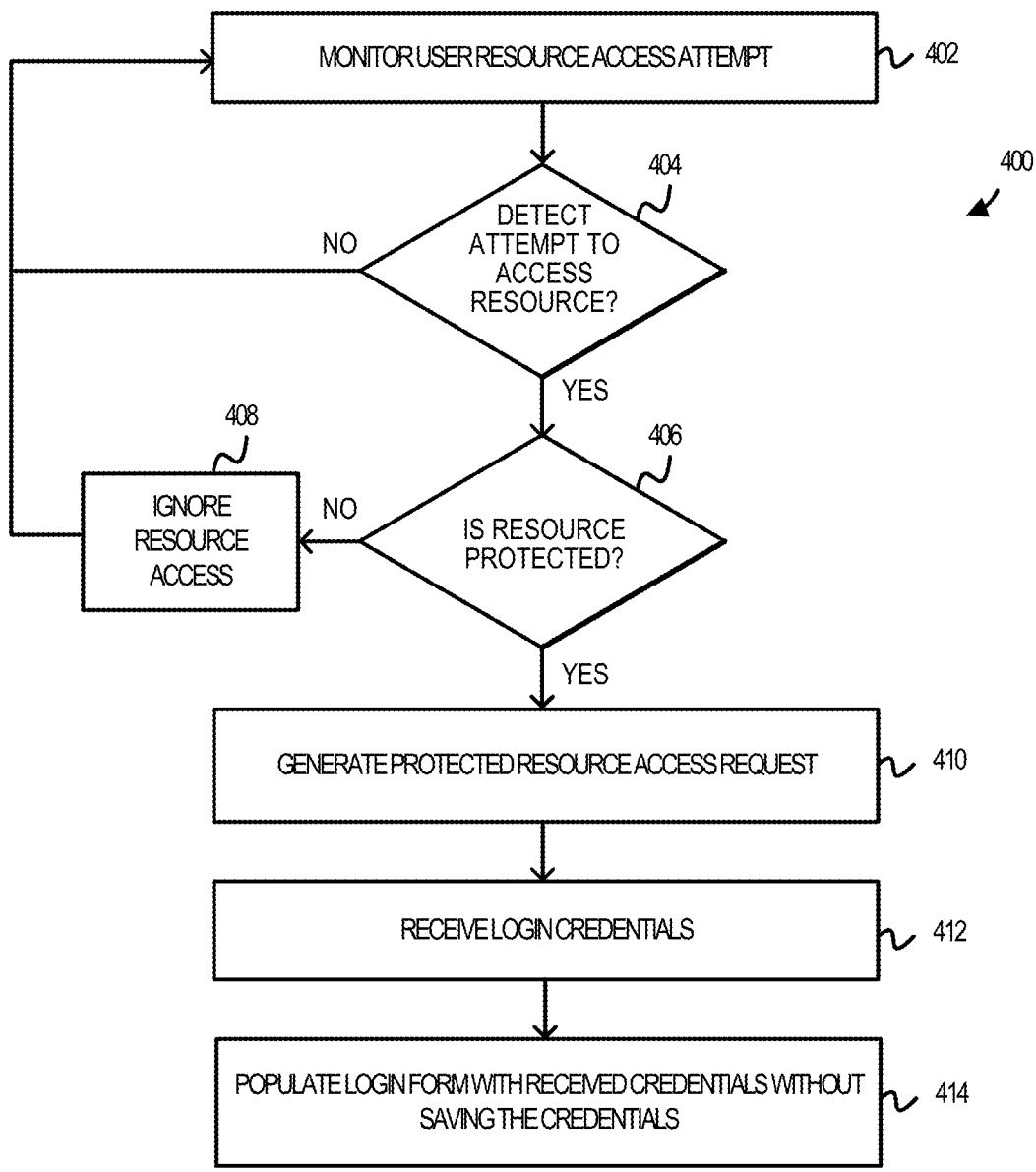
FIG. 4 depicts a flow diagram illustrating example operation of a browser extension for operating with a web browser on an electronic computing device, according to some embodiments.

FIG. 4 depicts a flow diagram illustrating an example operation 400 of a browser extension for operating with a web browser on an electronic computing device, according to some embodiments. The example operation 400 may be performed in various embodiments by an access device and, more particularly, a browser extension operating with a web browser on the access device such as, for example, browser extension 111 operating on access system 110 of FIG. 1.

As discussed above, prior to execution of example operation 400 it is assumed that one or more resources have been registered for the end user.

To begin, at step 402, the browser extension monitors user resource access attempts. At decision step 404, the browser extension detects whether a user resource access attempt is detected. If a user resource access attempt is detected, at decision step 406, the browser extension determine if the resource is protected. However, if a user resource access attempt is not detected, the browser extension returns to monitoring step 402.

If the resource is protected, at step 410, the browser extension generates a protected resource access request. At step 412, the browser extension receives login credentials. Lastly, at step 414, the browser extension populates the login form with the received login credentials without saving the login credentials to system memory. Because the login credentials are not saved system memory, the credentials are no longer present or accessible via the access system once the credentials have been submitted to the resource for access.

Figure 5:
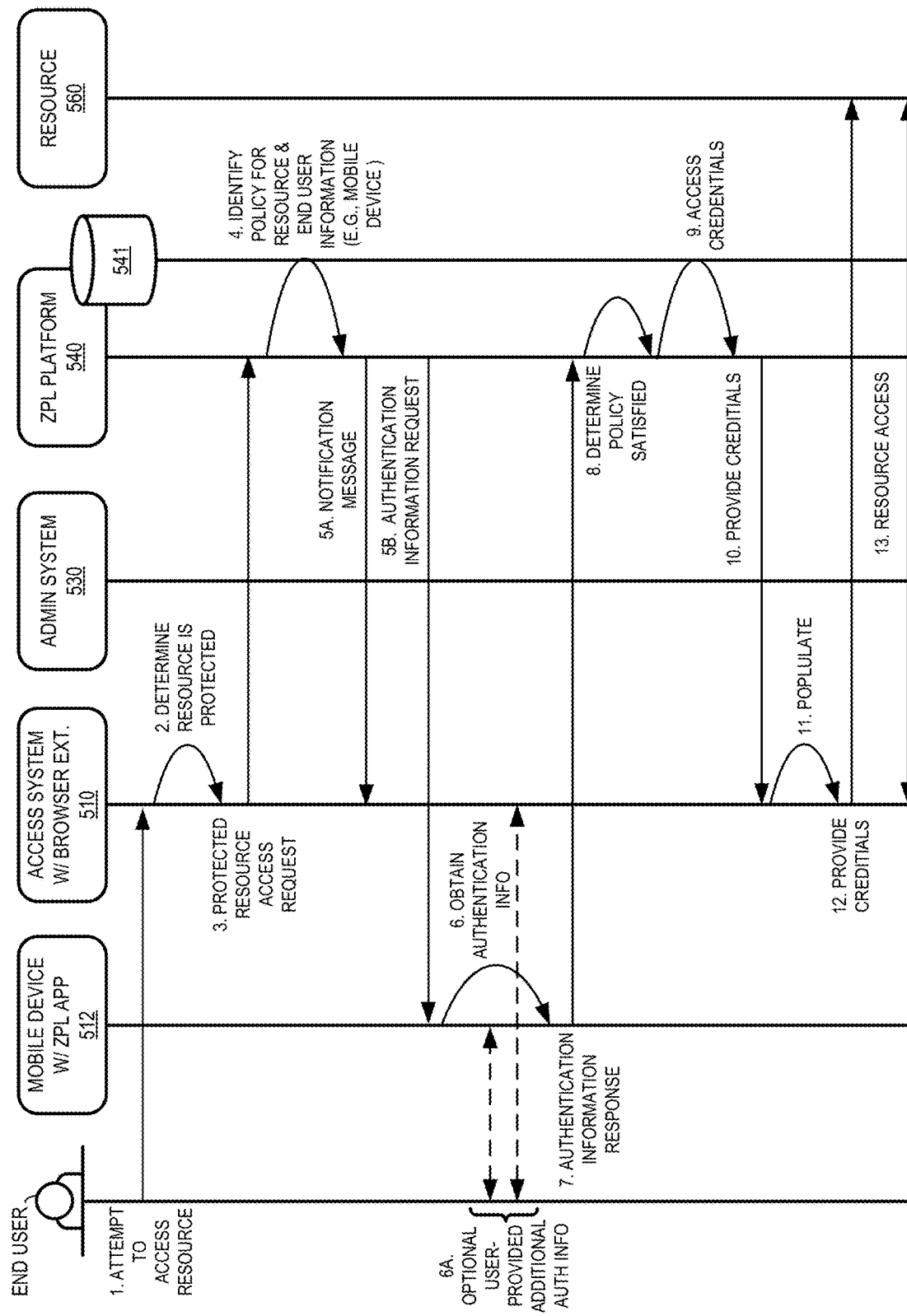
FIG. 5 depicts a sequence diagram illustrating example operation in an example for facilitating secure, credential-free user access to resources, according to some embodiments.

FIG. 5 depicts a sequence diagram illustrating example operation of various devices, systems, and an end users for facilitating secure, zero password user access to resources via credential management (zero password login) platform, according to some embodiments. More specifically, FIG. 5 illustrates a scenario in which an end user is attempting to gain credential-free access to privileged resource 560 via a credential management (ZPL) platform 540. The privileged resource 560 and the secondary authentication device, i.e., the mobile device 512, have been previously registered with the credential management (ZPL) platform 540.

The example of FIG. 5 includes a secondary authentication device (mobile device 512 having a ZPL application installed thereon), an access system with a browser extension 510, an administrator system 530, a credential management (zero password login) platform 540 with data store 541, and a resource 560. Initially, at step 1, the end user attempts to access the resource. For example, the end user may open a web browser and enter the URL www.Facebook.com to access the user's Facebook™ account. At step 2, the browser extension executing on the web browser detects that Facebook™ is a privileged resource. The browser extension can detect that the resource is a privileged resource by, for example, looking up a hash value stored inside the browser locally. At step 3, the browser extension responsively generates and sends a protected resource access request to the credential management (ZPL) platform 540.

At step 4, the credential management (ZPL) platform 540 processes the protected resource access request to identify a predetermined authentication policy corresponding to the privileged resource and various end user information for verifying the identity of the end user. For example, the end user information can include information about a secondary authentication device i.e., the mobile device 512. Optionally, at step 5A, the credential management (ZPL) platform 540 responsively generates and sends a notification message to the access system. The notification message can be displayed by the access system to the end user and indicate a variety of information. For example, the notification might identify the policy or policies associated with the resource and provide the end user with status information regarding the authentication "Facebook™ is on policy 1: Geofencing. We are currently verifying that you are located in the predetermined geofence area." It is appreciated that more or less information can be provided to the end users.

Once the secondary authentication device (mobile deice 512) is identified, at step 5B, the credential management (ZPL) platform 540 generates and sends an authentication information request to the secondary authentication device (mobile device 512). The authentication information request indicates additional information to be obtained by the secondary authentication device. As discussed above, the additional information that is requested can be determined by the policy or policies that are preconfigured for accessing the resource during the registration process. By way of example, the additional information can include relative device proximity information, geolocation information (e.g., GPS or IP information), biometric information, device movement information, PIN information, etc. Although a single request for information is shown, it is appreciated that the credential management (ZPL) platform 540 may request additional information more than once depending on the policy and/or the information obtained in the authentication information responses.

In some embodiments, the ZPL application running on the mobile device processes the authentication information request and, at step 6, obtains the requested information. As discussed, in some instances, the mobile device, at step 6A, can request that the user provide some input, e.g., movements, fingerprint, retinal scan, etc. Once the requested information is obtained, at step 7, the mobile device 512 generates and sends an authentication information response to the credential management (ZPL) platform 540. At step 8, the credential management (ZPL) platform 540 processes the response to determine whether the policy is satisfies. If so, at step 9, the credential management (ZPL) platform 540 accesses the credentials from the data store 541. In some embodiments, the credentials might need to be decrypted at the credential management (ZPL) platform 540 and/or the access system 510.

At step 10, the credential management (ZPL) platform 540 provides the credentials to the access system 510 and, more particularly, the browser extension operating with a web browser on the access system 510. At step 11, the browser extension populates the webpage or other login form with the credentials but does not otherwise store the credentials. At step 12, the access system 510 provides the credentials and/or otherwise submits the login form to the resource and, at step 13, resource access is established. Once submitted, the credentials are no longer available or stored on the access system 510.

Although not shown, in some embodiments, the credential management (ZPL) platform 540 can alternatively log into Facebook on behalf of the user and provide session information to the browser extension. For example, the credential management (ZPL) platform 540 can provide a php session ID to the browser extension. The browser extension can subsequently refresh the page with the session ID to then establish the resource access.

Figure 6:
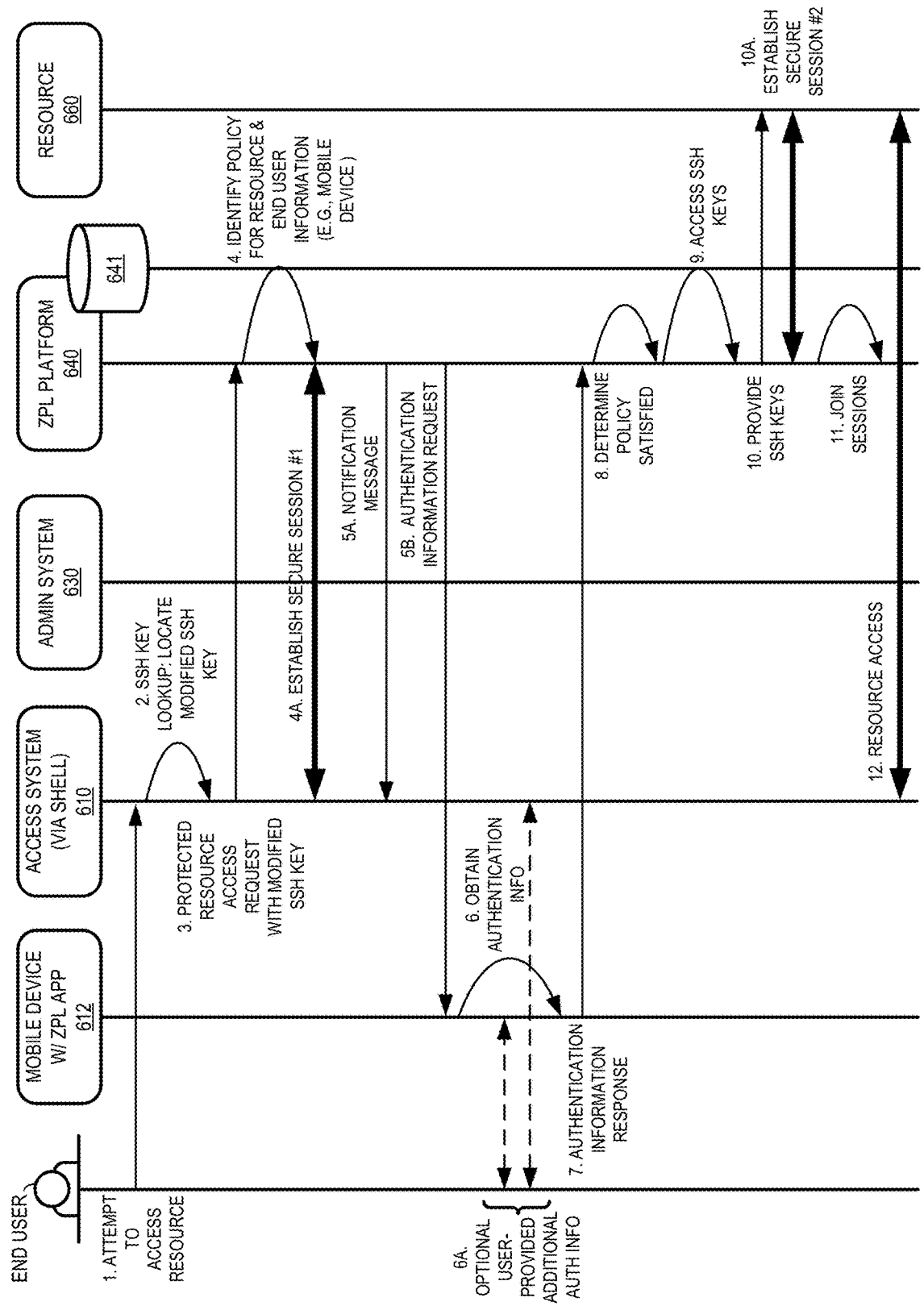
FIG. 6 depicts a sequence diagram illustrating example operation in an example for facilitating secure, credential-free user access to resources, according to some embodiments.

FIG. 6 depicts a sequence diagram illustrating example operation of various devices, systems, and an end users for facilitating secure, zero password user access to resources via credential management (zero password login) platform, according to some embodiments. More specifically, FIG. 6 illustrates a scenario in which an end user (employee) is attempting to gain credential-free access to an enterprise system (resource such as, for example, enterprise rack servers 164.

Like FIG. 5, the example of FIG. 6 includes a secondary authentication device (mobile device 612 having a ZPL application installed thereon), an access system with a browser extension 610, an administrator system 630, a credential management (zero password login) platform 640 with data store 641, and a resource 660. Initially, at step 1, the end user (employee) attempts to access the resource. For example, the end user may open a CLI shell and attempt to login to a server by typing an ssh command. At step 2, the SSH looks up the SSH-keys stored in the .ssh directory on the system and creates a fingerprint indicating that the end user (employee) is trying to connect to resource 660 (server). In the example of FIG. 6, the SSH key that is stored in the .ssh directory is a modified SSH key that points to the credential management (ZPL) platform 640. The modified SSH key is used to obtain the actual SSH key at the credential management (ZPL) platform 540.

At step 3, a protected resource access request is generated and sent to the credential management (ZPL) platform 540. The protected resource access request includes the modified SSH key. At step 4, the credential management (ZPL) platform 640 processes the protected resource access request to identify a predetermined authentication policy corresponding to the privileged resource and various end user information for verifying the identity of the end user. For example, the end user information can include information about a secondary authentication device, i.e., the mobile device 612. At step 4A, a secure session is established between the access system 610 and the credential management (ZPL) platform 640. Optionally, at step 5A, the credential management (ZPL) platform 640 responsively generates and sends a notification message to the access system. The notification message can be displayed by the access system to the end user and indicate a variety of information.

Once the secondary authentication device (mobile deice 562) is identified, at step 5B, the credential management (ZPL) platform 640 generates and sends an authentication information request to the secondary authentication device (mobile device 612). The authentication information request indicates additional information to be obtained by the secondary authentication device. As discussed above, the additional information that is requested can be determined by the policy or policies that are preconfigured for accessing the resource during the registration process. By way of example, the additional information can include relative device proximity information, geolocation information (e.g., GPS or IP information), biometric information, device movement information, PIN information, etc. Although a single request for information is shown, it is appreciated that the credential management (ZPL) platform 640 may request additional information more than once depending on the policy and/or the information obtained in the authentication information responses.

In some embodiments, the ZPL application running on the mobile device processes the authentication information request and, at step 6, obtains the requested information. As discussed, in some instances, the mobile device, at step 6A, can request that the user provide some input, e.g., movements, fingerprint, retinal scan, etc. Once the requested information is obtained, at step 7, the mobile device 612 generates and sends an authentication information response to the credential management (ZPL) platform 640. At step 8, the credential management (ZPL) platform 640 processes the response to determine whether the policy is satisfies. If so, at step 9, the credential management (ZPL) platform 640 accesses the SSH key from the data store 641. In some embodiments, the SSH key might need to be decrypted at the credential management (ZPL) platform 640.

At step 10, the credential management (ZPL) platform 640 provides the SSH key to the resource 660 and, at step 10A establishes a secure session between the credential management (ZPL) platform 640 and the resource 660. At step 11, the sessions are joined resulting in resource access.

Figure 7:
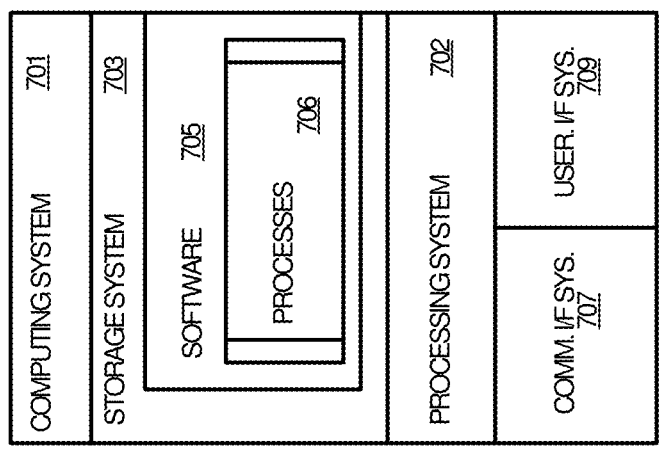
FIG. 7 illustrates a computing system suitable for implementing any of the architectures, components, applications, services, processes, and operational scenarios disclosed herein with respect to FIGS. 1-6 and discussed below in the Technical Disclosure.

FIG. 7 illustrates computing system 701 that is representative of any system or collection of systems in which the various operational architectures, scenarios, and processes disclosed herein may be implemented. Examples of computing system 701 include, but are not limited to, smart phones, laptop computers, tablet computers, desktop computers, hybrid computers, gaming machines, virtual machines, smart televisions, smart watches and other wearable devices, as well as any variation or combination thereof. In other examples, other types of computers may be involved in the processes, including server computers, rack servers, web servers, cloud computing platforms, and data center equipment, as well as any other type of physical or virtual server machine, and any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and user interface system 709.

Processing system 702 loads and executes software 705 from storage system 503. Software 705 can include a various example processes, which are representative of the processes discussed with respect to the preceding FIGS. 1-6. When executed by processing system 702 to facilitate secure credential-free user access to resources, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions for implementing enhanced callback operations and related functionality.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software or other application software, in addition to or that include callback process 706. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system customized to facilitate enhanced callback operations. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

It may be understood that computing system 701 is generally intended to represent a computing system or systems on which software 705 may be deployed and executed in order to implement enhanced callback operations. However, computing system 701 may also be suitable as any computing system on which software 705 may be staged and from where it may be distributed, transported, downloaded, or otherwise provided to yet another computing system for deployment and execution, or yet additional distribution.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here.

User interface system 709 may also include associated user interface software executable by processing system 702 in support of the various user input and output devices discussed above. Separately or in conjunction with each other and other hardware and software elements, the user interface software and user interface devices may support a graphical user interface, a natural user interface, or any other type of user interface.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A method of operating a credential management platform:
    receiving a request to access a protected resource from a first computing device, wherein the request comprises a modified secure shell (SSH) key;
    identifying an authentication policy for the protected resource;
    establishing a first secure session between the credential management platform and the first computing device;
    authenticating the first computing device using authentication information specified by the authentication policy, wherein the authentication information is obtained from a zero-password login application installed on a second computing device;
    upon authenticating the first computing device, providing the modified SSH key to the protected resource;
    establishing a second secure session between the credential management platform and the protected resource; and
    providing the first computing device with access to the protected resource by joining the first secure session and the second secure session.

2. The method of claim 1, wherein:
    the request to access the protected resource is initiated by a shell executing on the first computing device; and
    the modified SSH key uniquely identifies a user of the first computing device.

3. The method of claim 1, wherein:
    the request to access the protected resource is initiated by a browser extension of the first computing device; and
    the SSH key uniquely identifies a user of the first computing device.

4. The method of claim 1, wherein authenticating the first computing device using authentication information specified by the authentication policy and obtained from a second computing device comprises:
    generating a request for authentication information based on the authentication policy associated with the protected resource and a user of the first computing device;
    sending the request for authentication information for delivery to the second computing device, wherein the second computing device is associated with the user of the first computing device;
    receiving a response to the request for authentication sent by the user device;
    processing the response to the request for authentication; and
    determining that the authentication policy is satisfied.

5. The method of claim 1, wherein the authentication policy includes a geofencing policy that is satisfied when the second computing device is located within a predetermined area.

6. The method of claim 1, wherein the authentication policy includes a proximity policy that is satisfied when the second computing device is proximate to the first computing device.

7. The method of claim 6, wherein a Bluetooth connection is indicative of the second computing device and the first computing device being sufficiently proximate to satisfy the proximity policy.

8. A credential management apparatus comprising:
one or more non-transitory computer readable media;
one or more processors coupled to the one or more non-transitory computer readable media; and
program instructions stored on the non-transitory computer readable media, wherein the program instructions direct the one or more processors to:
receive a protected resource access request initiated on a first computing device, wherein the request comprises a modified (secure shell) SSH key that uniquely identifies a user;
establish a first secure session between the first computing device and the credential management apparatus;
authenticate the user according to an authentication policy associated with the protected resource, wherein authentication information specified by the authentication policy is obtained from a zero-password login application installed on a second computing device;
provide the modified SSH key to the protected resource;
establish a second secure session between the credential management apparatus and the protected resource; and
provide user access to the protected resource by joining the first secure session and the second secure session.

9. The credential management apparatus of claim 8, wherein the request to access the protected resource is initiated by a shell executing on the first computing device or a browser extension of the first computing device.

10. The credential management apparatus of claim 8, wherein the SSH key uniquely identifies a user of the first computing device.

11. The credential management apparatus of claim 8, wherein the authentication policy is further based on information related to the first computing device.

12. The credential management apparatus of claim 8, wherein, to authenticate the user according to an authentication policy associated with the protected resource, the program instructions further direct the one or more processors to:
generate a request for authentication information based on the authentication policy associated with the protected resource and a user of the first computing device;
send the request for authentication information for delivery to a second computing device, wherein the second computing device is associated with the user of the first computing device;
receive a response to the request for authentication sent by the user device;
process the response to the request for authentication; and
determine that the authentication policy is satisfied.

13. The credential management apparatus of claim 12, wherein the authentication policy includes a geofencing policy that is satisfied when the second computing device is located within a predetermined area.

14. The credential management apparatus of claim 12, wherein the authentication policy includes a proximity policy that is satisfied when the second computing device is proximate to the first computing device.

15. The credential management apparatus of claim 14, wherein a Bluetooth connection is indicative of the second computing device and the first computing device being sufficiently proximate to satisfy the proximity policy.

16. A method comprising:
in a first computing device:
receiving a request to access a protected resource; and
sending the request to a credential management platform, wherein the request includes a modified secure shell (SSH) that uniquely identifies a user;
in the credential management platform:
receiving the request from the first computing device;
identifying an authentication policy for the protected resource;
establishing a first secure session between the first computing device and the credential management platform; and
sending a request for authentication information to a second computing device associated with the user, wherein the second computing device has a zero-password login application installed thereon;
in the second computing device:
receiving the request for authentication information;
obtaining the authentication information from the zero-password login application; and
sending a response to the request to the credential management platform that includes the authentication information; and
in the credential management platform:
receiving the response to the request for authentication information;
determining that the authentication policy is satisfied;
providing the modified SSH key to the protected resource;
establishing a second secure session between the credential management platform and the protected resource; and
providing the first computing device access to the protected resource by joining the first second session and the second secure session.

17. The method of claim 16, wherein the authentication policy includes a geofencing policy that is satisfied when the second computing device is located within a predetermined area.

18. The method of claim 16, wherein the authentication policy includes a proximity policy that is satisfied when the second computing device is proximate to the first computing device and a Bluetooth connection is indicative of the second computing device and the first computing device being sufficiently proximate.

* * * * *